United States Patent
Yu et al.

(10) Patent No.: US 9,565,140 B2
(45) Date of Patent: Feb. 7, 2017

(54) HARQ MEMORY SPACE MANAGEMENT FOR LTE CARRIER AGGREGATION

(71) Applicant: MEDIATEK, INC., Hsin-Chu (TW)

(72) Inventors: Chia-Hao Yu, Yilan County (TW); Ju-Ya Chen, Kaohsiung (TW); Yih-Shen Chen, Hsinchu (TW)

(73) Assignee: MEDIATEK, INC., Hsin-Chu (TW)

( * ) Notice: Subject to any disclaimer, the term of this patent is extended or adjusted under 35 U.S.C. 154(b) by 78 days.

(21) Appl. No.: 14/052,619

(22) Filed: Oct. 11, 2013

(65) Prior Publication Data

US 2015/0103752 A1    Apr. 16, 2015

(51) Int. Cl.
  *H04W 4/00* (2009.01)
  *H04L 12/861* (2013.01)
  *H04L 5/00* (2006.01)
  *H04L 1/18* (2006.01)

(52) U.S. Cl.
  CPC ......... *H04L 49/9005* (2013.01); *H04L 1/1822* (2013.01); *H04L 1/1874* (2013.01); *H04L 5/001* (2013.01); *H04L 5/0055* (2013.01)

(58) Field of Classification Search
  CPC ..... H04L 1/1812; H04L 5/003; H04L 49/9005
  USPC .......................................................... 370/329
  See application file for complete search history.

(56) References Cited

U.S. PATENT DOCUMENTS

| | | | |
|---|---|---|---|
| 2012/0087396 A1* | 4/2012 | Nimbalker et al. | 375/219 |
| 2012/0120889 A1* | 5/2012 | Cheng et al. | 370/329 |
| 2012/0188952 A1* | 7/2012 | Baldemair et al. | 370/329 |
| 2012/0275397 A1* | 11/2012 | Hsieh et al. | 370/329 |

* cited by examiner

*Primary Examiner* — Mang Yeung
(74) *Attorney, Agent, or Firm* — Imperium Patent Works; Zheng Jin; Helen Mao (57) ABSTRACT

A user equipment (UE) receives and decodes a first erroneous transport block (TB) from a base station in a mobile communication network. The UE allocates a first soft buffer having a first buffer size. The first soft buffer is associated with a first HARQ process for storing the first TB. The UE then receives and decodes a second erroneous TB from the base station. The UE allocates a second soft buffer having a second buffer size. The second soft buffer is associated with a second HARQ process for storing the second TB. The UE releases a portion of the first soft buffer to be allocated as part of the second soft buffer. The dynamic buffer allocation method reduces mismatch between rate matching and soft buffer storing when the total number of HARQ processes is small. In addition, more HARQ processes can be supported when the corresponding TB size is small.

24 Claims, 11 Drawing Sheets

| NUMBER OF HARQ PROCESS | | NUMBER OF AGGREGATED CCS | | | | |
|---|---|---|---|---|---|---|
| | | N=1 | N=2 | N=3 | N=4 | N=5 |
| PER-HARQ BUFFER SIZE | A/x | x (8) | $\lfloor \frac{x}{2} \rfloor$ (4) | $\lfloor \frac{x}{3} \rfloor$ (2) | $\lfloor \frac{x}{4} \rfloor$ (2) | $\lfloor \frac{x}{5} \rfloor$ (1) |
| | A/(2x) | N/A | x (8) | $\lfloor \frac{2x}{3} \rfloor$ (5) | $\lfloor \frac{2x}{4} \rfloor$ (4) | $\lfloor \frac{2x}{5} \rfloor$ (3) |
| | A/(3x) | N/A | N/A | $\lfloor \frac{3x}{3} \rfloor$ (8) | $\lfloor \frac{3x}{4} \rfloor$ (6) | $\lfloor \frac{3x}{5} \rfloor$ (4) |
| | A/(4x) | N/A | N/A | N/A | $\lfloor \frac{4x}{4} \rfloor$ (8) | $\lfloor \frac{4x}{5} \rfloor$ (6) |
| | A/(5x) | N/A | N/A | N/A | N/A | $\lfloor \frac{5x}{5} \rfloor$ (8) |

FIG. 3

PER-CC BUFFER POOLING WITH FIXED RESOLUTION

COMMON BUFFER POOLING WITH FIXED RESOLUTION
FIG. 10

COMMON BUFFER POOLING WITH VARIABLE RESOLUTION

FIG. 16

FLOW CHART FOR DYNAMIC HARQ BUFFER ALLOCATION

FIG. 17

HARQ MEMORY SPACE MANAGEMENT FOR LTE CARRIER AGGREGATION

TECHNICAL FIELD

The disclosed embodiments relate to Hybrid Automatic Repeat Request (HARQ) memory space management for carrier aggregation in LTE mobile communication networks.

BACKGROUND

A Long-Term Evolution (LTE) system offers high peak data rates, low latency, improved system capacity, and low operating cost resulting from simple network architecture. An LTE system also provides seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred as user equipments (UEs). Enhancements to LTE systems are considered so that they can meet or exceed International Mobile Telecommunications Advanced (IMT-Advanced) fourth generation (4G) standard.

One of the key enhancements is to support bandwidth up to 100 MHz and be backwards compatible with the existing wireless network system. Carrier aggregation (CA) is introduced to improve the system throughput. With carrier aggregation, the LTE-Advance system can support peak target data rates in excess of 1 Gbps in the downlink (DL) and 500 Mbps in the uplink (UL). Such technology is attractive because it allows operators to aggregate several smaller contiguous or non-continuous component carriers (CC) to provide a larger system bandwidth, and provides backward compatibility by allowing legacy users to access the system by using one of the CCs.

A technique referred to as Hybrid Automatic Repeat ReQuest (HARQ) is employed for error detection and correction. In a standard Automatic Repeat ReQuest (ARQ) method, error detection bits are added to data to be transmitted. In Hybrid ARQ, error correction bits are also added. When the receiver receives a data transmission, the receiver uses the error detection bits to determine if data has been lost. If it has, then the receiver may be able to use the error correction bits to recover (decode) the lost data. If the receiver is not able to recover the lost data using the error correction bits, then the receiver may use a second transmission of additional data (including more error correction information) to recover the data. Error correction can be performed by combining information from the initial transmission with additional information from one or more subsequent retransmissions.

In order to perform HARQ, certain amount of HARQ memory space is required to store the data. Furthermore, multiple HARQ processes are needed to detect and recover multiple erroneous transport blocks (TBs). For LTE systems in FDD, the HARQ memory space is equally divided for 8 HARQ processes for transmission modes (TMs) without spatial multiplexing, and 16 HARQ processes for TMs with spatial multiplexing. For LTE systems in TDD, the number of required HARQ processes varies based on the corresponding TDD UL-DL configuration. The buffer size for each HARQ process is calculated by considering the maximum TB size (TBS). Depending on UE category and TM, either full buffer size or limited buffer rate matching (LBRM) is designed for each HARQ process. Already in Rel-8/9, UE may be short of HARQ processes since the specified minimum requirement on the number of HARQ processes can be smaller than the maximally required number. This may have an impact on the peak system throughput if conservative scheduling method is used by the network.

With carrier aggregation, the HARQ memory space is not increased to take into account CA behavior for UE category 1-5 due to backwards compatibility. The buffer size for each HARQ process is still equally divided among serving cells in CA scenarios, which makes the received coded bits possible to be bigger than its buffer size. For UE category 6-7, although the total soft channel bit buffer size is increased, it is designed to be backwards compatible to UE category four. All of these indicates that the soft channel bit buffer may be smaller than what is assumed at eNB. In LTE Rel-10, rules are defined for discarding overflowed coded bits at UE side, while the rate matching at eNB remains the same. This creates a mismatch between eNB rate matching and UE soft bit storing for both FDD and TDD modes and performance degradation is expected. In LTE Rel-11, different TDD UL-DL configuration among aggregated cells are supported. As a result, the maximum number of required HARQ processes may not be the same, thus different HARQ performance among different serving cells is expected. A solution is sought to provide intelligent HARQ buffer management for reducing the mismatch between rate matching at eNB and soft buffer storing at UE when the total number of active HARQ processes is small, and for increasing the total number of HARQ processes than minimum requirements when TBS is small.

SUMMARY

A method of dynamic HARQ memory space management and soft buffer allocation for LTE carrier aggregation (CA) is proposed. A user equipment (UE) receives and decodes a first erroneous transport block (TB) from a base station in a mobile communication network. The UE allocates a first soft buffer having a first buffer size. The first soft buffer is associated with a first HARQ process for storing the first TB. The UE then receives and decodes a second erroneous TB from the base station. The UE allocates a second soft buffer having a second buffer size. The second soft buffer is associated with a second HARQ process for storing the second TB. The UE releases a portion of the first soft buffer to be allocated as part of the second soft buffer. By dynamically allocating the HARQ soft buffer to various HARQ processes, a larger buffer size can be allocated by UE initially to reduce mismatch between rate matching and soft buffer storing when the total number of HARQ processes is small. In addition, by releasing part of the original allocated soft buffer, a smaller buffer size can be allocated by UE to support more HARQ processes when the corresponding TBS is small.

In a first embodiment, per-CC buffer pooling with fixed resolution is proposed for reducing the mismatch between rate matching and soft buffer storing. In a second embodiment, per-CC buffer pooling with variable resolution is proposed for reducing the mismatch between rate matching and soft buffer storing, and for increasing the total number of HARQ processes when TBS is small. In a third embodiment, common buffer pooling with fixed resolution and with same HARQ process number requirement for individual CCs is proposed for reducing the mismatch between rate matching and soft buffer storing. In a fourth embodiment, common buffer pooling with fixed resolution and with different HARQ process number requirement for individual CCs is proposed for reducing the mismatch between rate matching and soft buffer storing. In a fifth embodiment, common buffer pooling with variable resolution is proposed for reducing the mismatch between rate matching and soft buffer storing, and for increasing the total number of HARQ processes when TBS is small.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
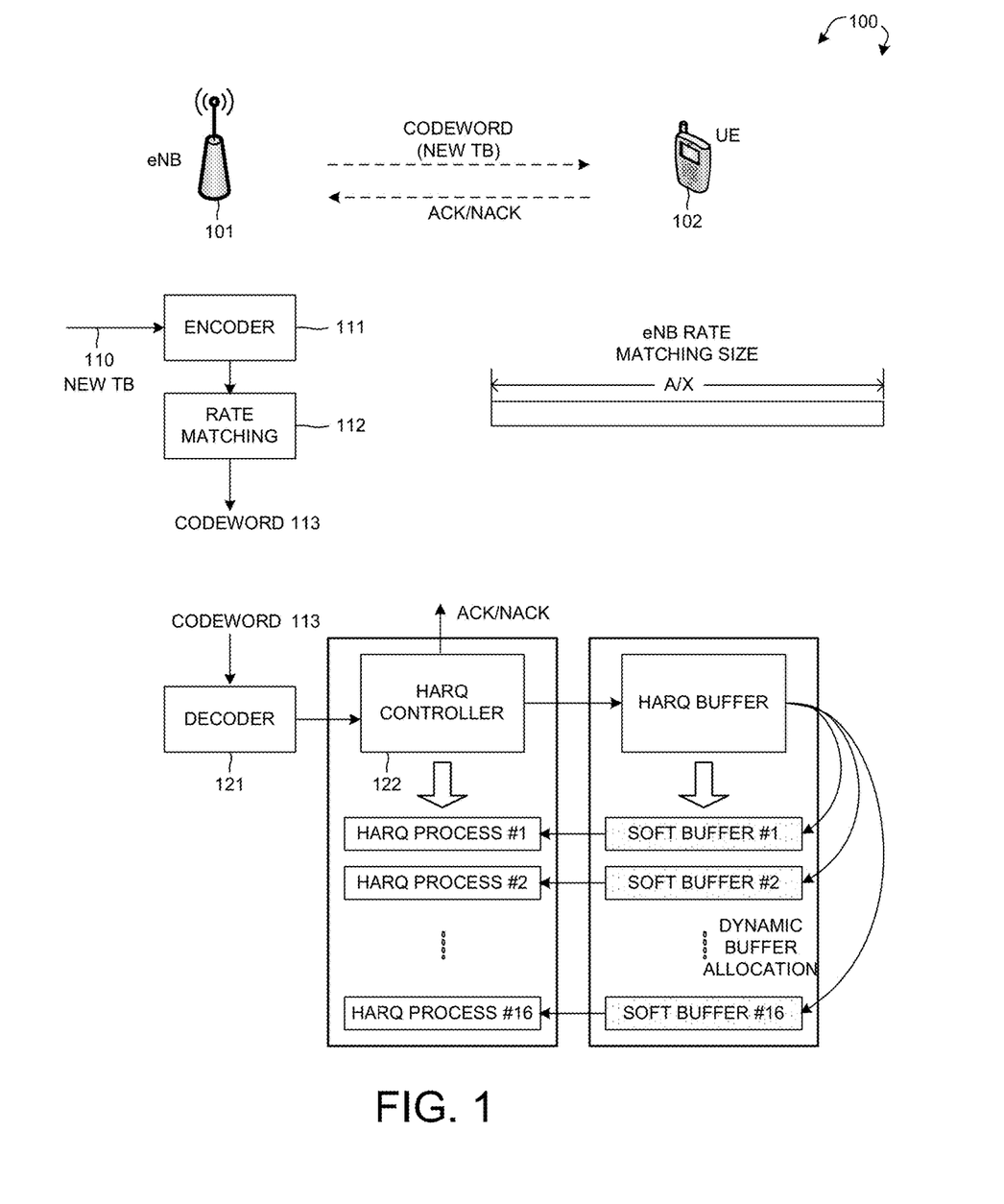
FIG. 1 illustrates a mobile communication network with dynamic buffer allocation for HARQ processes in accordance with one novel aspect.

FIG. 1 illustrates a mobile communication network 100 with dynamic buffer allocation for HARQ processes in accordance with one novel aspect. Mobile communication network 100 is an LTE system having a base station eNB 101 and a user equipment UE 102. For downlink (DL) data transmission, at the transmitter side, eNB 101 takes a new transport block (TB) as encoder input, performs encoding via encoder 111 and rate matching via rate-matching module 112, and generates a codeword 113 corresponding to the new TB to be transmitted to UE 102. The eNB then performs rate matching based on physical resource allocation. The eNB may assume full buffer size or use LBRM (limited buffer rate matching) depending on FDD/TDD mode, UE category, and TM (with or without spatial multiplexing). For example, if the total HARQ memory space is A, and the required number of HARQ processes is x, then the buffer size for each HARQ process at UE side is A/x, without take into account carrier aggregation (CA) behavior. At eNB side, eNB 101 thus assumes rate-matching size is limited by A/x, and the size of the coded bits after rate matching can be as large as A/x.

At the receiver side, UE 102 receives codeword 113, performs decoding via decoder 121, and sends out an ACK or NACK back to eNB 101 based on the decoding result. If a new TB turns out to be an erroneous TB after decoding, then eNB 101 retransmits the TB after receiving the NACK, and UE 102 performs HARQ via HARQ controller 122. For each new erroneous TB, the HARQ controller 122 assigns an HARQ process, stores the erroneous TB in a corresponding soft buffer, and waits for retransmission data from eNB 101 to perform data recovery. For example, TB#1 is associated with HARQ process #1 having soft buffer #1, TB#2 is associated with HARQ process #2 having soft buffer #2 . . . and so on so forth. If the total HARQ memory space is A, and the required number of HARQ processes for UE 102 is x, then the total buffer size for each HARQ process is A/x without CA. However, under CA, if the number of aggregated component carriers (CCs) is N, then the total buffer size for each CC is only A/N based on the 3GPP specifications. As a result, at UE side, each HARQ process could be assigned with A/(x*N) buffer size by UE 102. That is, the size of the coded bits after rate matching by eNB can be N times bigger than the reserved buffer size by UE.

In accordance with one novel aspect, the HARQ soft buffers are allocated dynamically. Various solutions are proposed. In a first embodiment, per-CC buffer pooling with fixed resolution is proposed for reducing the mismatch between rate matching and soft buffer storing. In a second embodiment, per-CC buffer pooling with variable resolution is proposed for reducing the mismatch between rate matching and soft buffer storing, and for increasing the total number of HARQ processes when TBS is small. Increasing the number of HARQ processes is beneficial in LTE TDD mode, when a UL-DL configuration requires more HARQ processes than specified by the 3GPP standards. In a third embodiment, common buffer pooling with fixed resolution and with same HARQ process number requirement for individual CCs is proposed for reducing the mismatch between rate matching and soft buffer storing. In a fourth embodiment, common buffer pooling with fixed resolution and with different HARQ process number requirement for individual CCs is proposed for reducing the mismatch between rate matching and soft buffer storing. In a fifth embodiment, common buffer pooling with variable resolution is proposed for reducing the mismatch between rate matching and soft buffer storing, and for increasing the total number of HARQ processes when TBS is small.

Figure 2:
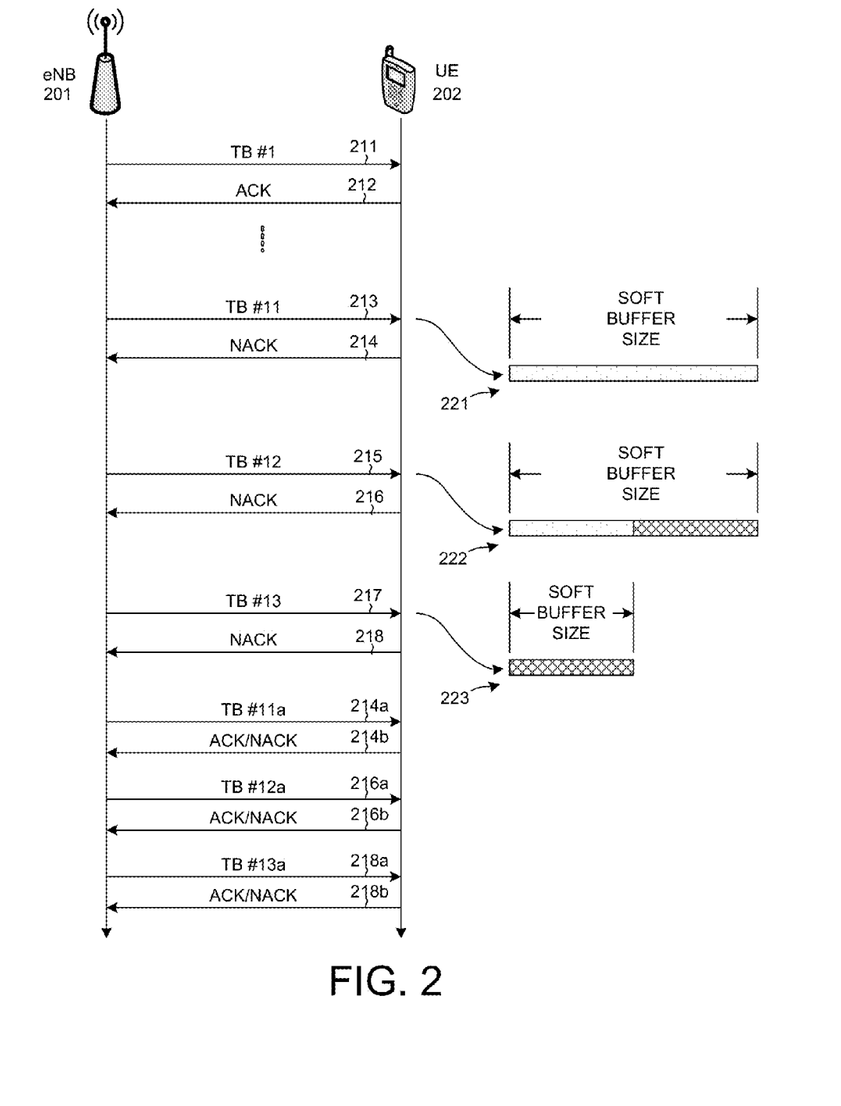
FIG. 2 illustrates a procedure of performing HARQ with dynamic buffer allocation.

FIG. 2 illustrates a procedure of performing HARQ with dynamic buffer allocation. In step 211, eNB 201 sends TB#1 to UE 202, which sends an ACK back to eNB 201 in step 212 upon successful decoding of TB#1. This DL transmission can be repeated for many TBs between eNB 201 and UE 202. Later, in step 213, eNB 201 sends TB#11 to UE 202, which sends a NACK back to eNB 201 in step 214 and starts an HARQ process #1 upon decoding error. The HARQ process #1 is allocated with a soft buffer 221 having a predefined buffer size to store TB#11. Next, in step 215, eNB 201 sends TB#12 to UE 202, which sends a NACK back to eNB 201 in step 216 and starts an HARQ process #2 upon decoding error. The HARQ process #2 is allocated with a soft buffer 222 having a predefined buffer size to store TB#12. More TBs with decoding error may happen between eNB 201 and UE 202, which starts more HARQ processes. For example, in step 217, eNB 201 sends TB#13 to UE 202, which sends a NACK back to eNB 201 in step 218 and starts another HARQ process #3 upon decoding error. However, all HARQ buffer space has been allocated to other HARQ processes.

In one novel aspect, part of the soft buffer 222 is released and allocated as another soft buffer 223 for HARQ process

3 to store TB#13. Note that the original predefined buffer size allocated for soft buffer 222 may be larger than a minimum system requirement, while the remaining buffer space of soft buffer 222 after the releasing still fulfills the minimum system requirement, and is still possible to store all redundancy versions of TB#12 when its TBS is small. Later, having received NACK messages, eNB 201 retransmits TB#11a to UE 202 in step 214a, retransmits TB#12a in step 216a, and retransmits TB#13a in step 218a. UE 202 then performs data recovery by combining the stored TB#11 and retransmitted TB#11a, combining the stored TB#12 and retransmitted TB#12a, and combining the stored TB#13 and retransmitted TB#13a. Depending on the data recovery result, UE 202 sends an ACK/NACK back to eNB 201 in step 214b, 216b, and 218b respectively. By dynamically allocating the HARQ soft buffer to various HARQ processes, a larger buffer size can be allocated by UE initially to reduce mismatch between rate matching and soft buffer storing when the total number of used HARQ processes is small. In addition, by releasing part of the original allocated soft buffer, a smaller buffer size can be allocated by UE to support more HARQ processes when the corresponding TBS is small.

Figure 3:
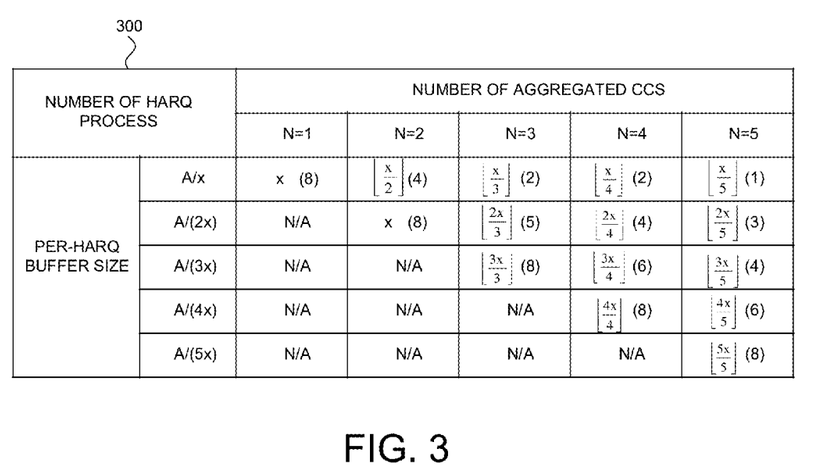
FIG. 3 illustrates a number of required HARQ processes with different number of aggregated CCs and per-HARQ buffer size.

FIG. 3 illustrates a number of required HARQ processes with different number of aggregated CCs and per-HARQ buffer size. In LTE systems, there are certain system requirements including the number of HARQ processes and the minimum HARQ buffer size for each UE. The number of HARQ processes is different for FDD/TDD with or without spatial multiplexing. For illustration purpose, assume that the total HARQ memory space is A, the required number of HARQ processes per CC is x (e.g., x=8 for FDD without spatial multiplexing), and the number of activated CCs for carrier aggregation is N. It is further assumed here that the HARQ memory pool is equally divided among each activated CC as specified in the 3GPP standards. As a result, the total HARQ soft buffer size for each CC is A/N, and each HARQ process is required to be assigned with at least A/(x*N) buffer space at UE.

As illustrated in FIG. 3, if the number of aggregated CCs N=1, then the number of HARQ processes can be x with per-HARQ buffer size=A/x. If the number of aggregated CCs N=2, then the number of HARQ processes can be x with per-HARQ buffer size=A/2x, or can be $$\left\lfloor \frac{x}{2} \right\rfloor$$

with per-HARQ buffer size=A/x, where $\lfloor a \rfloor$ enotes the closest integer lower than a. If the number of aggregated CCs N=3, then the number of HARQ processes can be x with per-HARQ buffer size=A/3x, can be $$\left\lfloor \frac{2x}{3} \right\rfloor$$

with per-HARQ buffer size=A/2x, or can be $$\left\lfloor \frac{x}{3} \right\rfloor$$

with per-HARQ buffer size=A/x. If the number of aggregated CCs N=4, then the number of HARQ processes can be x with per-HARQ buffer size=A/4x, can be $$\left\lfloor \frac{3x}{4} \right\rfloor$$

with per-HARQ buffer size=A/3x, can be $$\left\lfloor \frac{2x}{4} \right\rfloor$$

with per-HARQ buffer size=A/2x, or can be $$\left\lfloor \frac{x}{4} \right\rfloor$$

with per-HARQ buffer size=A/x. If the number of aggregated CCs N=5, then the number of HARQ processes can be x with per-HARQ buffer size=A/5x, can be $$\left\lfloor \frac{4x}{5} \right\rfloor$$

with per-HARQ buffer size=A/4x, can be $$\left\lfloor \frac{3x}{5} \right\rfloor$$

with per-HARQ buffer size=A/3x, can be $$\left\lfloor \frac{2x}{5} \right\rfloor$$

with per-HARQ buffer size=A/2x, or can be $$\left\lfloor \frac{1x}{5} \right\rfloor$$

with per-HARQ buffer size=A/x. Note that in FIG. 3, the values in parentheses denotes the case when x=8. As per-HARQ buffer size increases, the number of HARQ processes decreases so that the total HARQ memory space equals A. In addition, as the number of aggregated CCs N increases, per-HARQ buffer size decreases for supporting the same number of HARQ processes for each individual CC.

Figure 4:
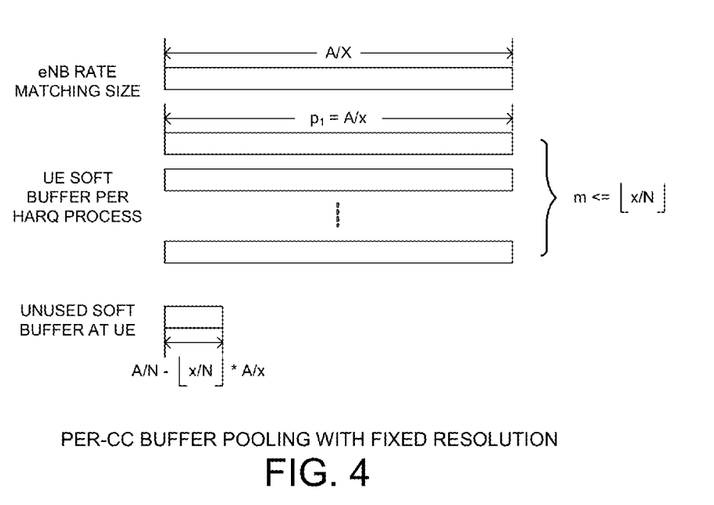
FIGS. 4-8 illustrate a first embodiment of per-CC buffer pooling with fixed resolution.

FIGS. 4-8 illustrate a first embodiment of per-CC buffer pooling with fixed resolution. For per-CC buffer pooling with fixed resolution, the total HARQ memory pool is equally divided among each activated CC, and each HARQ soft buffer is allocated with a predefined size regardless of the size of a corresponding erroneous TB. FIG. 4 illustrates HARQ buffer allocation when the number of erroneous TBs requiring HARQ buffer is $m \leq \lfloor x/N \rfloor$, (scenario #1). At eNB side, the rate matching size is A/x. The same buffer size as the rate matching size, e.g., $p_1$=A/x, is reserved at UE side for soft channel bits per HARQ process. The unused soft buffer at UE per CC is equal to $A/N-\lfloor x/N \rfloor *A/x < A/x$. There is no performance degradation compare to non-CA case, because the buffer size is the same as the rate matching size, which is possible when the number of HARQ processes m is small.

Figure 5:
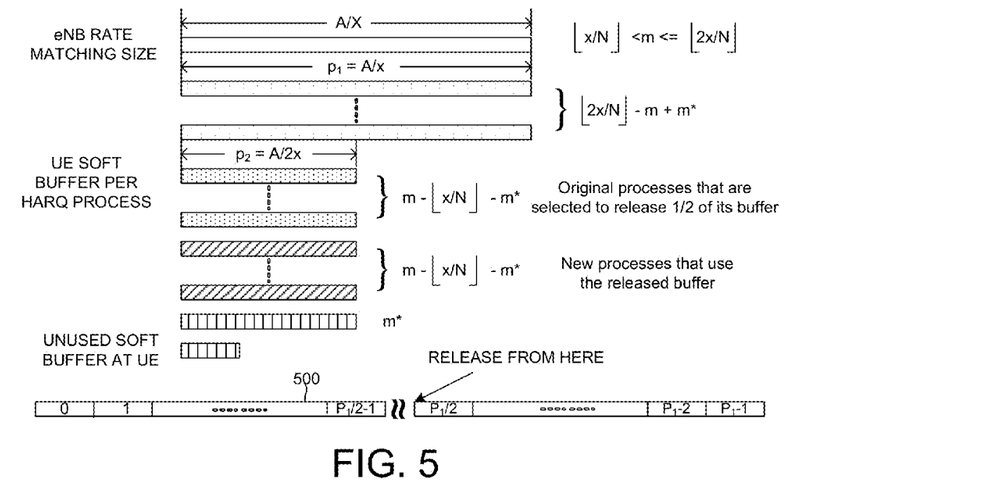

FIG. 5 illustrates HARQ buffer allocation when the number of TBs requiring HARQ buffer is $\lfloor x/N \rfloor < m <= \lfloor 2x/N \rfloor$ (scenario #2). Under the second scenario, the UE first checks whether the unused buffer size is bigger than $p_2 = A/2x$ to support one TB. If yes, then m*=1; otherwise, m*=0. The UE then selects $m-\lfloor x/N \rfloor -m^*$ processes from the first $\lfloor x/N \rfloor$ processes, and releases half of its buffer space for the new $m-\lfloor x/N \rfloor -m^*$ processes. The selection may be prioritized based on TBS, e.g., HARQ processes with smaller TBS have higher priority to be selected. When releasing buffer space of the existing HARQ process buffer, the UE prioritizes the received soft channel bits with lower index corresponding to the bits in its circular buffer and releases the buffer space with higher index corresponding to the bits in its circular buffer. For example, for buffer 500 having $[0-p_1-1]$ soft channel bits, the buffer space with low index $[0-p_1/2-1]$ remains as the original buffer, while the buffer space with high index $[p_1/2-p_1-1]$ are released for the new process. The buffer size of the selected $m-\lfloor x/N \rfloor -m^*$ processes and the new $m-\lfloor x/N \rfloor$ processes is $p_2=A/2x$, and $p_2=p_1/2$. Scenario #2 is only applicable for N>=2. When the number of HARQ processes m increases, the newly allocated HARQ buffer size decreases accordingly, but still fulfills the minimum system requirement of $A/(x*N)$.

Figure 6:
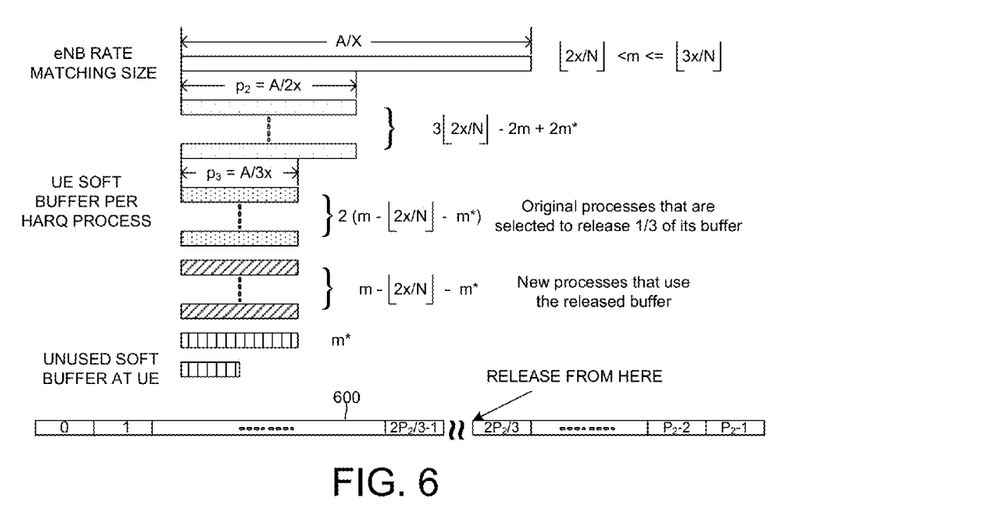

FIG. 6 illustrates HARQ buffer allocation when the number of TBs requiring HARQ buffer is $\lfloor 2x/N \rfloor < m <= \lfloor 3x/N \rfloor$ (scenario #3). Under the third scenario, the UE first checks whether the unused buffer size is bigger than $p_3=A/3x$ to support one TB. If yes, then m*=1; otherwise, m*=0. The UE then selects $2(m-\lfloor 2x/N \rfloor -m^*)$ processes from the first $\lfloor 2x/N \rfloor$ processes, and releases one-third of its buffer space for the new $m-\lfloor 2x/N \rfloor -m^*$ processes. The selection may be prioritized based on TBS, e.g., HARQ processes with smaller TBS have higher priority to be selected. Here, the UE releases a fraction of space from two existing processes to make space for one new process. If the number of existing processes is not an even number, then the UE tries to combine the last release with the unused buffer and check if it is enough for a new process. When releasing buffer space of the existing HARQ process buffer, the UE prioritizes the received soft channel bits with lower index corresponding to the bits in its circular buffer and releases the buffer space with higher index corresponding to the bits in its circular buffer. For example, for buffer 600 having $[0-p_2-1]$ soft channel bits, the buffer space with low index $[0-2p_2/3-1]$ remains as the original buffer, while the buffer space with high index $[2p_2/3-p_2-1]$ are released for the new process. The buffer size of the selected $2(m-\lfloor x/N \rfloor -m^*)$ processes and the new $m-\lfloor 2x/N \rfloor$ processes is $p_3=A/3x$, and $p_3=2p_2/3$. Scenario #3 is only applicable for N>=3. When the number of HARQ processes m increases, the newly allocated HARQ buffer size decreases accordingly, but still fulfills the minimum system requirement of $A/(x*N)$.

Figure 7:
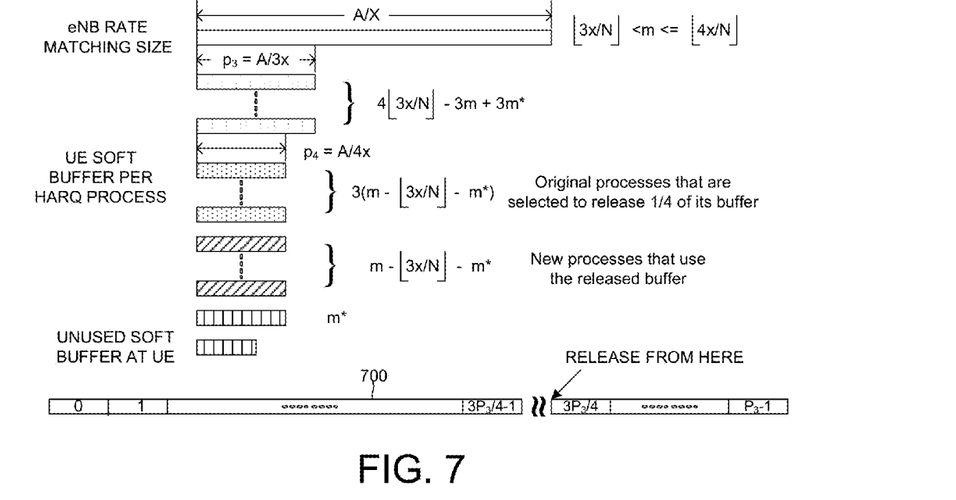

FIG. 7 illustrates HARQ buffer allocation when the number of TBs requiring HARQ buffer is $\lfloor 3x/N \rfloor < m <= \lfloor 4x/N \rfloor$ (scenario #4). Under the fourth scenario, the UE first checks whether the unused buffer size is bigger than $p_4=A/4x$ to support one TB. If yes, then m*=1; otherwise, m*=0. The UE then selects $3(m-\lfloor 3x/N \rfloor -m^*)$ processes from the first $\lfloor 3x/N \rfloor$ processes and releases one-fourth of its buffer space for the new $m-\lfloor 3x/N \rfloor -m^*$ processes. The selection may be prioritized based on TBS, e.g., HARQ processes with smaller TBS have higher priority to be selected. Here, the UE releases a fraction of space from three existing processes to make space for one new process. If the number of existing processes is not a multiple number of 3, then the UE tries to combine the last release with the unused buffer and check if it is enough for a new process. When releasing buffer space of the existing HARQ process buffer, the UE prioritizes the received soft channel bits with lower index corresponding to the bits in its circular buffer and releases the buffer space with higher index corresponding to the bits in its circular buffer. For example, for buffer 700 having $[0-p_3-1]$ soft channel bits, the buffer space with low index $[0-3p_3/4-1]$ remains as the original buffer, while the buffer space with high index $[3p_3/4-p_3-1]$ are released for the new process. Note that the buffer size of the selected $3(m-\lfloor 3x/N \rfloor -m^*)$ processes and the new $m-\lfloor 3x/N \rfloor$ processes is $p_4=A/4x$, and $p_4=3p_3/4$. Scenario #4 is only applicable for N>=4. When the number of HARQ processes increases, the newly allocated HARQ buffer size decreases accordingly, but still fulfills the minimum system requirement of $A/(x*N)$.

Figure 8:
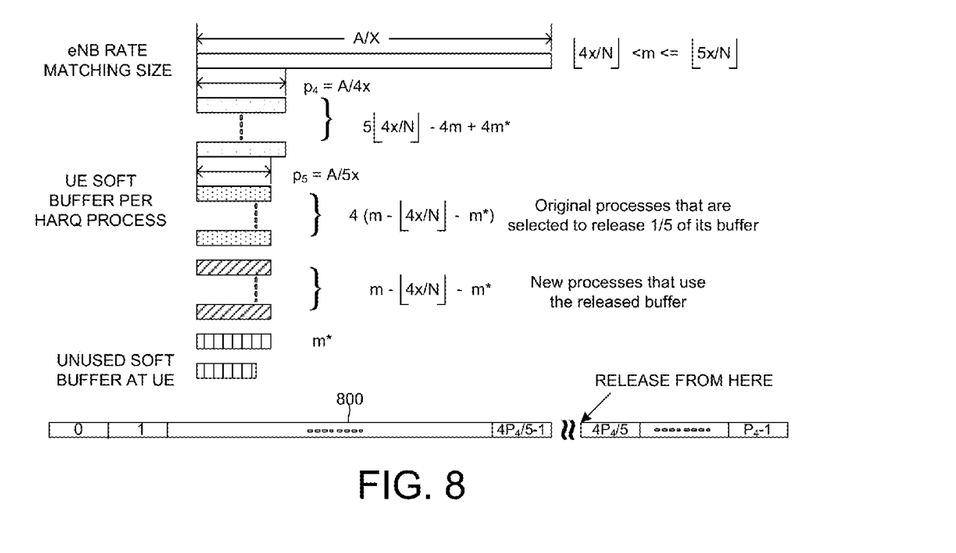

FIG. 8 illustrates HARQ buffer allocation when the number of TBs requiring HARQ buffer is $\lfloor 4x/N \rfloor < m <= \lfloor 5x/N \rfloor$ (scenario #5). Under the fifth scenario, the UE first checks whether the unused buffer size is bigger than $p_5=A/5x$ to support one TB. If yes, then m*=1; otherwise, m*=0. The UE then selects $4(m-\lfloor 4x/N \rfloor -m^*)$ processes from the first $\lfloor 4x/N \rfloor$ processes, and releases one-fifth of its buffer space for the new $m-\lfloor 4x/N \rfloor -m^*$ processes. The selection may be prioritized based on TBS, e.g., HARQ processes with smaller TBS have higher priority to be selected. Here, the UE releases a fraction of space from four existing processes to make space for one new process. If the number of existing processes is not a multiple number of 4, then the UE tries to combine the last release with the unused buffer and check if it is enough for a new process. When releasing buffer space of the existing HARQ process buffer, the UE prioritizes the received soft channel bits with lower index corresponding to the bits in its circular buffer and releases the buffer space with higher index corresponding to the bits in its circular buffer. For example, for buffer 800 having $[0-p_4-1]$ soft channel bits, the buffer space with low index $[0-4p_4/5-1]$ remains as the original buffer, while the buffer space with high index $[4p_4/5-p_4-1]$ are released for the new process. Note that the buffer size of the selected $4(m-\lfloor 4x/N \rfloor -m^*)$ processes and the new $m-\lfloor 4x/N \rfloor$ processes is $p_5=A/5x$, and $p_4=4p_4/5$. Scenario #5 is only applicable for N=5. When the number of HARQ processes increases, the newly allocated HARQ buffer size decreases accordingly, but still fulfills the minimum system requirement of $A/(x*N)$.

Figure 9:
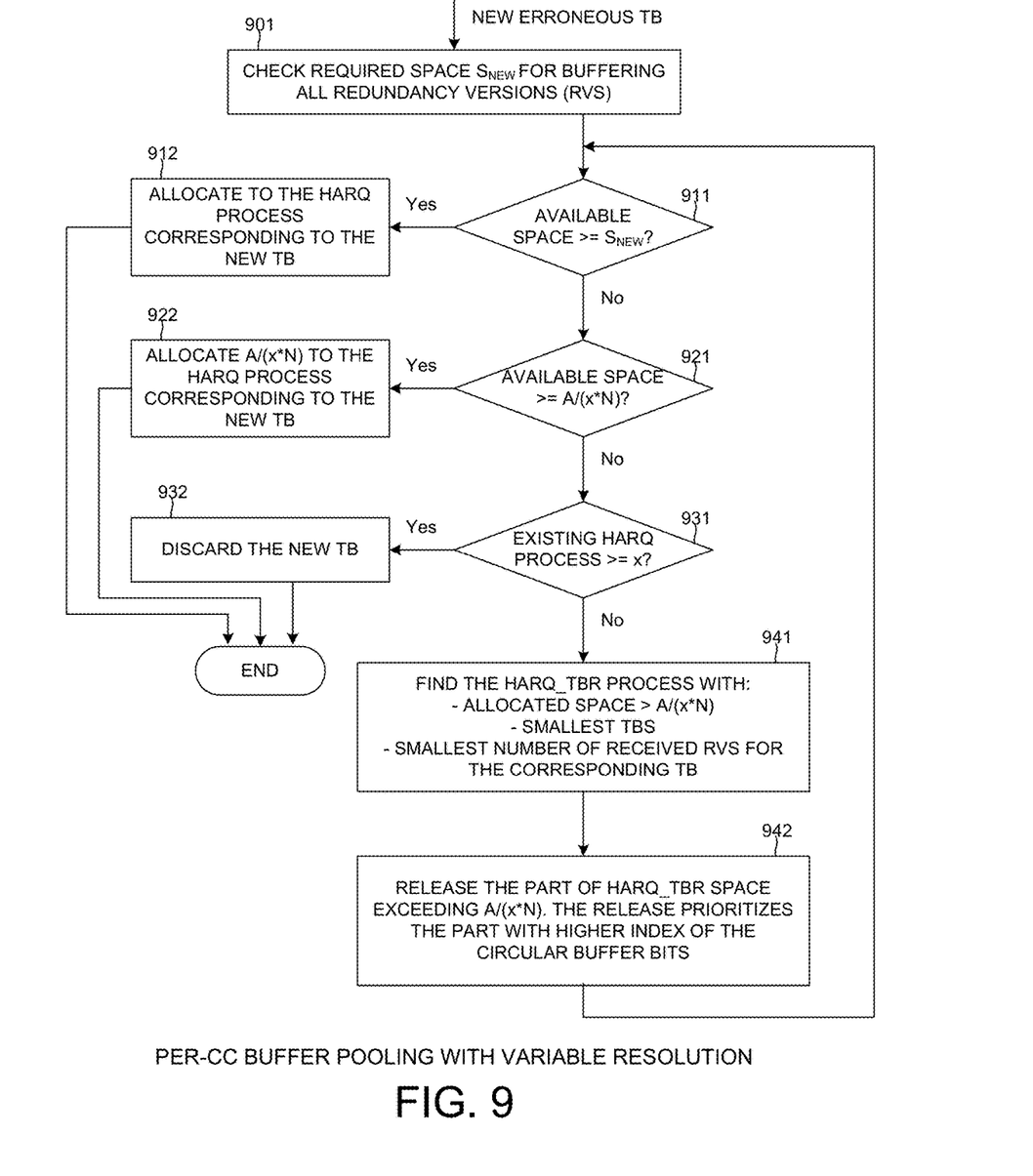
FIG. 9 illustrates a second embodiment of per-CC buffer pooling with variable resolution.

FIG. 9 illustrates a second embodiment of per-CC buffer pooling with variable resolution. For per-CC buffer pooling with variable resolution, the total HARQ memory pool is equally divided among each activated CC, and each HARQ soft buffer is allocated according to the size of a corresponding erroneous TB. In step 901, the UE receives a new erroneous TB, and checks required space $S_{NEW}$ for buffering all redundancy versions (RVs) of the new TB. In step 911, UE determines whether the available HARQ buffer space is larger or equal to $S_{NEW}$. If the answer is yes, then the UE allocates $S_{NEW}$ to the HARQ process corresponding to the new TB (step 912). If the answer is no, then in step 921, the UE determines whether the available HARQ buffer space is larger or equal to the minimum required buffer size $A/(x*N)$. If the answer is yes, then the UE allocates $A/(x*N)$ to the HARQ process corresponding to the new TB (step 922). If the answer is no, then in step 931, the UE determines whether the existing number of HARQ processes is larger or equal to x. If the answer is yes, then the UE discards the new TB in step 932 because the UE has already fulfilled the required number of HARQ processes per CC. If the answer is no, then in step 941, the UE finds an existing HARQ process that 1) has allocated buffer space larger than A/(x*N), 2) has the smallest TBS, and 3) has the smallest number of received RVs for the corresponding TB. Such HARQ process is denoted as HARQ_TBR (to be released). In step 942, the UE releases part of the HARQ_TBR buffer space that exceeds A/(x*N). The release is prioritized to the circular buffer bits with higher index. Afterwards, the UE goes back to step 911 and repeats the checking process again until the HARQ process corresponding to the new erroneous TB is allocated with a proper amount of buffer space to store the TB. With such variable resolution allocation, each HARQ soft buffer is allocated according to the size of a corresponding erroneous TB to optimize HARQ memory space management.

While per-CC buffer pooling illustrated above is one way to dynamically allocate HARQ soft buffer for carrier aggregation, common buffer pooling is another way for dynamic HARQ buffer allocation. FIGS. 10-14 illustrate a third embodiment of common buffer pooling with fixed resolution and with same HARQ process number requirement for individual CCs. For common buffer pooling with fixed resolution, the total HARQ memory pool is shared among all activated CCs, and each HARQ soft buffer is allocated with a predefined size regardless of the size of a corresponding erroneous TB. In addition, it is assumed that the system requirement on HARQ process number on individual CCs is the same, i.e., per-CC HARQ process number requirement is x. Note that with spatial multiplexing, the actual required HARQ process number is twice of the case without spatial multiplexing.

Figure 10:
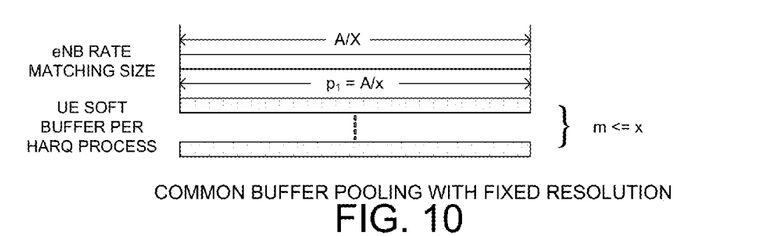
FIGS. 10-14 illustrate a third embodiment of common buffer pooling with fixed resolution and with same HARQ process number requirement for individual CCs.

FIG. 10 illustrates HARQ buffer allocation when the number of erroneous TBs requiring HARQ buffer is m<=x (scenario #1). At eNB side, the rate matching size is A/x, and the same buffer size as the rate matching is reserved at UE side for soft channel bits per HARQ process. For example, the buffer size per HARQ process $p_1$=A/x. There is no performance degradation compare to non-CA case, because the buffer size is the same as the rate matching, which is possible when the number of HARQ processes is small. Note that m is computed per UE in common buffer pooling method, not per-CC in per-CC pooling method.

Figure 11:
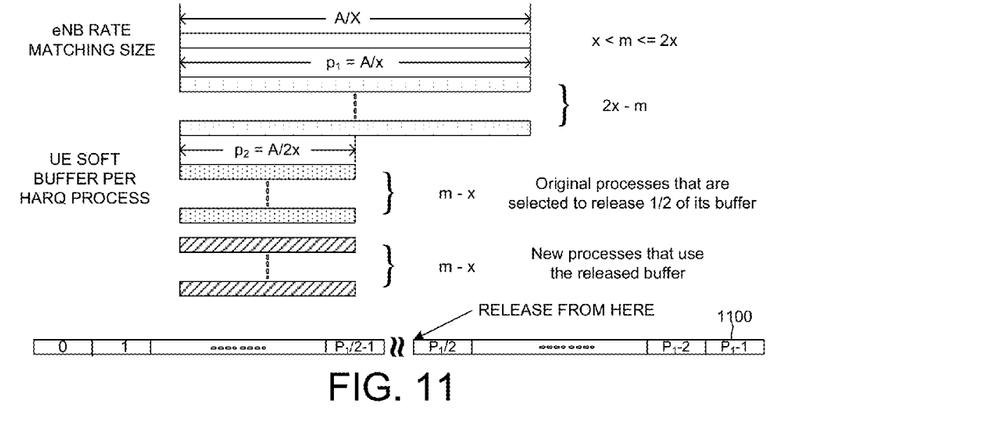

FIG. 11 illustrates HARQ buffer allocation when the number of erroneous TBs requiring HARQ buffer is x<m<=2x (scenario #2). Under the second scenario, the UE selects m-x processes from the first x processes, and releases half of its buffer space for the new m-x processes. The selection may be prioritized based on, e.g., TBS, that is, HARQ processes with smaller TBS have higher priority to be selected. When releasing buffer space of the existing HARQ process buffer, the UE prioritizes the received soft channel bits with lower index corresponding to the bits in its circular buffer and releases the buffer space with higher index corresponding to the bits in its circular buffer. For example, for buffer 1100 having [0-$p_1$-1] soft channel bits, the buffer space with low index [0-$p_1$/2-1] remains as the original buffer, while the buffer space with high index [$p_1$/2-$p_1$-1] are released for the new process. Note that the buffer size of the selected m-x processes and the new m-x processes is $p_2$=A/2x, and $p_2$=$p_1$/2. Scenario #2 is only applicable for N>=2. When the number of HARQ processes increases, the newly allocated HARQ buffer size decreases accordingly, but still fulfills the minimum system requirement of A/(x*N).

Figure 12:
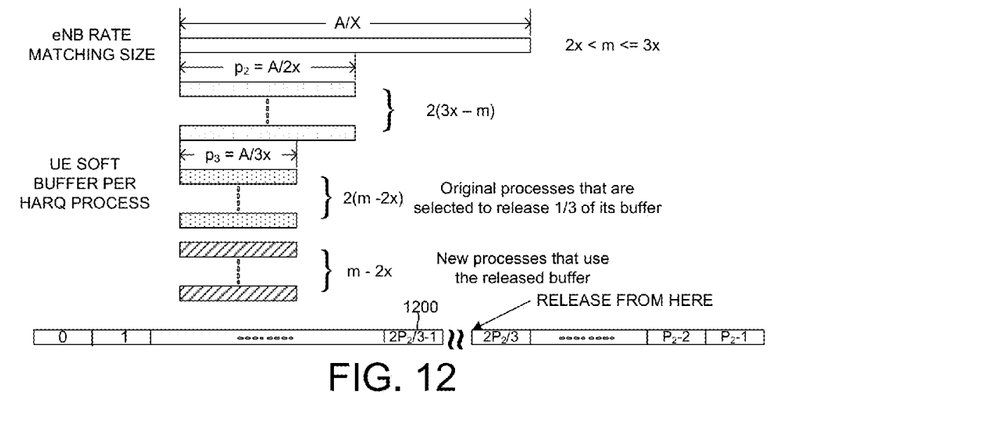

FIG. 12 illustrates HARQ buffer allocation when the number of erroneous TBs requiring HARQ buffer is 2x<m<=3x (scenario #3). Under the third scenario, the UE selects 2(m-2x) processes from the first 2x processes, and releases one-third of its buffer space for the new m-2x processes. The selection may be prioritized based on, e.g., TBS, that is, HARQ processes with smaller TBS have higher priority to be selected. Here, the UE releases a fraction of space from two existing processes to make space for one new process. When releasing buffer space of the existing HARQ process buffer, the UE prioritizes the received soft channel bits with lower index corresponding to the bits in its circular buffer and releases the buffer space with higher index corresponding to the bits in its circular buffer. For example, for buffer 1200 having [0-$p_2$-1] soft channel bits, the buffer space with low index [0-2$p_2$/3-1] remains as the original buffer, while the buffer space with high index [2$p_2$/3-$p_2$-1] are released for the new process. Note that the buffer size of the selected 2(m-2x) processes and the new m-2x processes is $p_2$=A/3x, and $p_2$=2$p_2$/3. Scenario #3 is only applicable for N>=3. When the number of HARQ processes increases, the newly allocated HARQ buffer size decreases accordingly, but still fulfills the minimum system requirement of A/(x*N).

Figure 13:
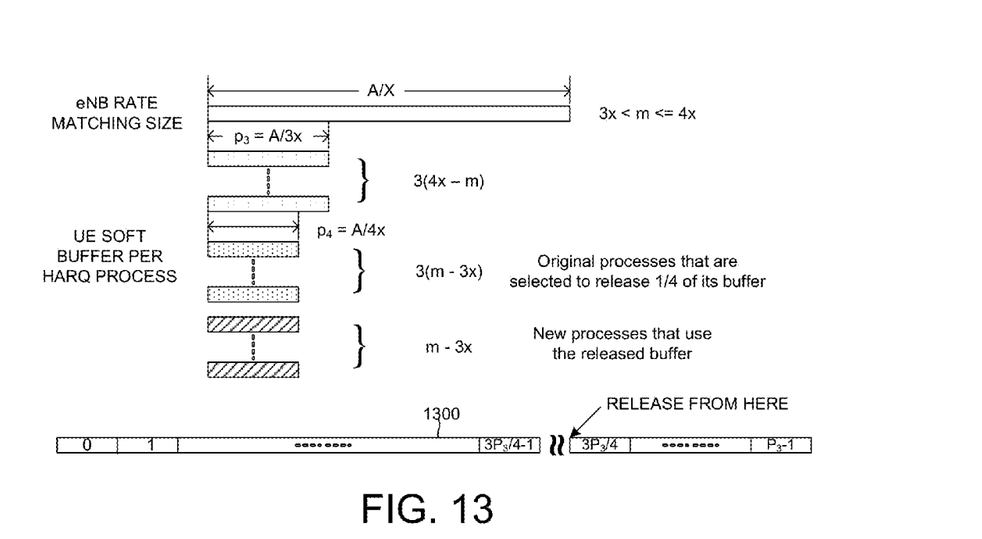

FIG. 13 illustrates HARQ buffer allocation when the number of erroneous TBs requiring HARQ buffer is 3x<m<=4x (scenario #4). Under the fourth scenario, the UE selects 3(m-3x) processes from the first 3x processes, and releases one-fourth of its buffer space for the new m-3x processes. The selection may be prioritized based on, e.g., TBS, that is, HARQ processes with smaller TBS have higher priority to be selected. Here, the UE releases a fraction of space from three existing processes to make space for one new process. When releasing buffer space of the existing HARQ process buffer, the UE prioritizes the received soft channel bits with lower index corresponding to the bits in its circular buffer and releases the buffer space with higher index corresponding to the bits in its circular buffer. For example, for buffer 1300 having [0-$p_3$-1] soft channel bits, the buffer space with low index [0-3$p_3$/4-1] remains as the original buffer, while the buffer space with high index [3$p_3$/4-$p_3$-1] are released for the new process. Note that the buffer size of the selected 3(m-3x) processes and the new m-3x processes is $p_4$=A/4x, and $p_4$=3$p_3$/4. Scenario #4 is only applicable for N>=4. When the number of HARQ processes increases, the newly allocated HARQ buffer size decreases accordingly, but still fulfills the minimum system requirement of A/(x*N).

Figure 14:
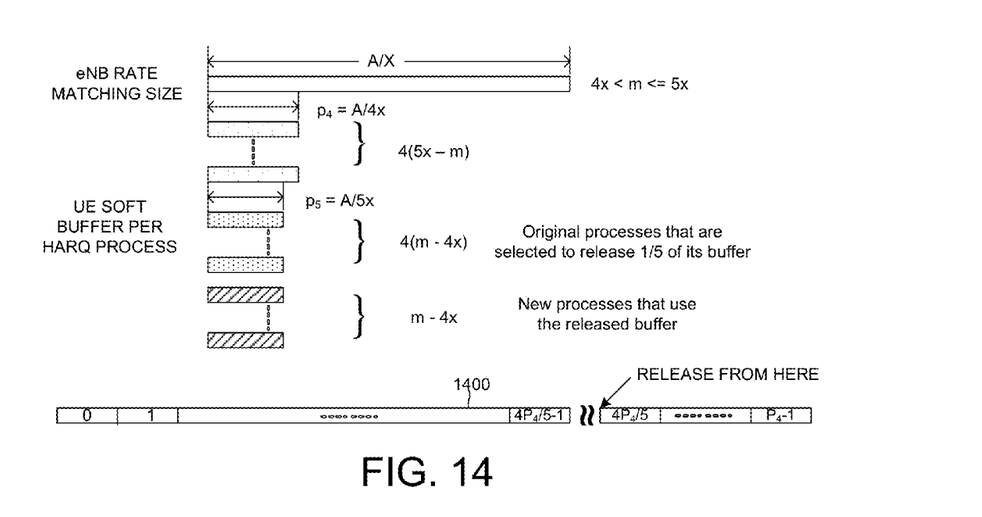

FIG. 14 illustrates HARQ buffer allocation when the number of erroneous TBs requiring HARQ buffer 4x<m<=5x (scenario #5). Under the fifth scenario, the UE selects 4(m-4x) processes from the first 4x processes, and releases one-fifth of its buffer space for the new m-4x processes. The selection may be prioritized based on, e.g., TBS, that is, HARQ processes with smaller TBS have higher priority to be selected. Here, the UE releases a fraction of space from four existing processes to make space for one new process. When releasing buffer space of the existing HARQ process buffer, the UE prioritizes the received soft channel bits with lower index corresponding to the bits in its circular buffer and releases the buffer space with higher index corresponding to the bits in its circular buffer. For example, for buffer 1400 having [0-$p_4$-1] soft channel bits, the buffer space with low index [0-4$p_4$/5-1] remains as the original buffer, while the buffer space with high index [$4p_4/5-p_4-1$] are released for the new process. Note that the buffer size of the selected 4(m−4x) processes and the new m−4x processes is $p_5=A/5x$, and $p_4=4p_4/5$. Scenario #5 is only applicable for N=5. When the number of HARQ processes increases, the newly allocated HARQ buffer size decreases accordingly, but still fulfills the minimum system requirement of A/(x*N).

Figure 15:
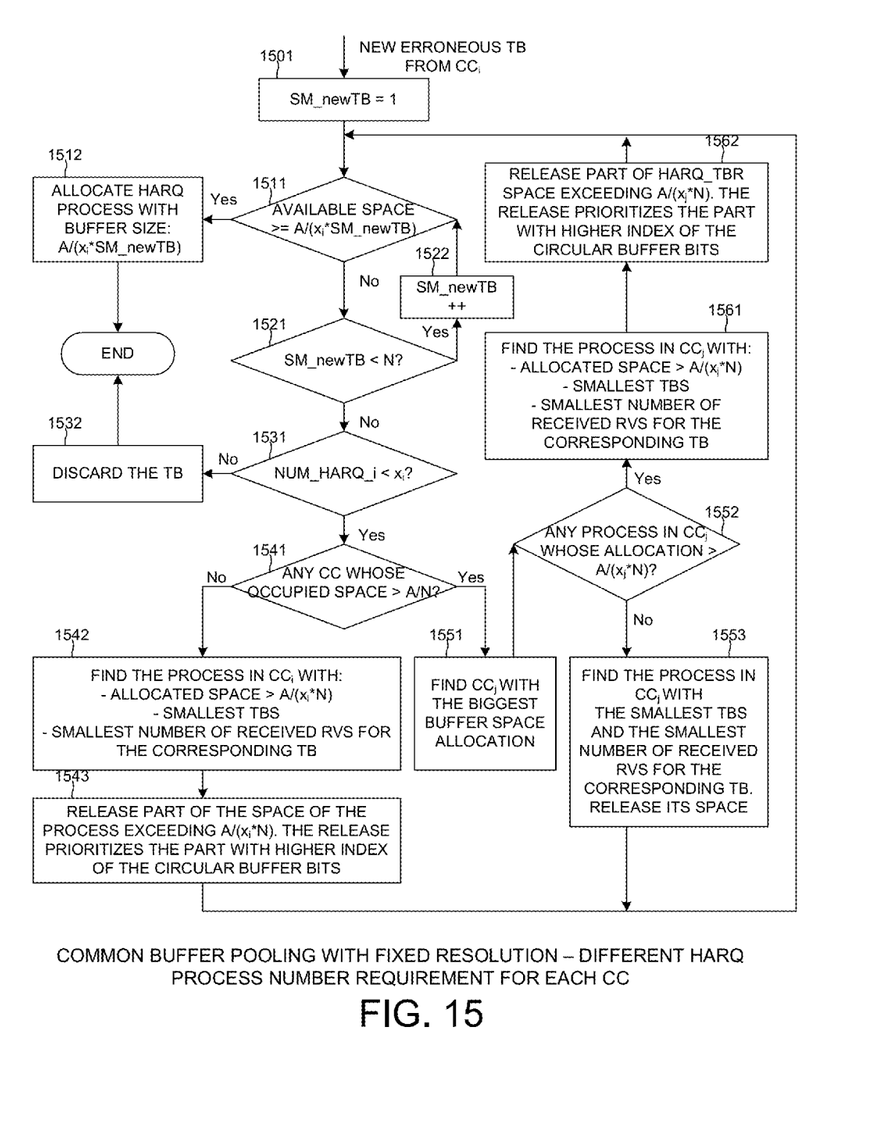
FIG. 15 illustrates a fourth embodiment of common buffer pooling with fixed resolution but with different HARQ process number requirement for individual CCs.

FIG. 15 illustrates a fourth embodiment of common buffer pooling with fixed resolution but with different HARQ process number requirement for individual CCs. In LTE Rel-11, different TDD UL-DL configuration among aggregated CCs are supported. As a result, the maximum number of required HARQ processes may not be the same for individual CCs. For example, the maximum number of HARQ processes equals to four for TDD configuration #0, seven for TDD configuration #1, ten for TDD configuration #2, nine for TDD configuration #3, twelve for TDD configuration #4, fifteen for TDD configuration #5, and six for TDD configuration 6. Assume per-CC HARQ process number requirement is $x_i$ for $CC_i$ and a size marker (SM) for each HARQ process is used to indicate the assigned buffer size. The value of the size marker equals to one if buffer size is $A/x_i$, two if buffer size is $A/2x_i$, three if buffer size is $A/3x_i$, four if buffer size is $A/4x_i$, and five if buffer size is $A/5x_i$.

In step 1501, the UE receives a new erroneous TB from $CC_i$, and starts with a size mark SM_newTB=1. In step 1511, the UE determines whether the available HARQ buffer space is larger or equal to $A/(x_i*SM\_newTB)$. If the answer is yes, then the UE allocates $A/(x_i*SM\_newTB)$ to the HARQ process corresponding to the new TB (step 1512). If the answer is no, then the UE checks whether SM_newTB<N in step 1521. If yes, then the UE increment SM_newTB by one in step 1522 and goes back to step 1511. If no, then the UE goes to step 1531 and checks if the existing number of HARQ processes for $CC_i$ is smaller than $x_i$. If the answer is no, then the UE discards the new TB in step 1532 because the UE has already fulfilled the required number of HARQ processes for $CC_i$. If the answer is yes, then in step 1541, the UE determines whether there is any CC whose occupied space is larger than A/N. If the answer is no, then in step 1542, the UE finds an existing HARQ process in $CC_i$ that 1) has allocated buffer space larger than $A/(x_i*N)$, 2) has the smallest TBS, and 3) has the smallest number of received RVs for the corresponding TB. In step 1543, the UE releases part of the buffer space that exceeds $A/(x_i*N)$. The release is prioritized to the circular buffer bits with higher index. Afterwards, the UE goes back to step 1511 and repeats the checking process again to find buffer space for the new TB.

If the answer to step 1541 is yes, then the UE finds $CC_j$ with the biggest buffer space allocation in step 1551. In step 1552, the UE checks whether there is any HARQ process in $CC_j$ whose buffer allocation is larger than $A(x_j*N)$. If the answer is no, then the UE finds the HARQ process in $CC_j$ with the smallest number of received RVs for the corresponding TB and has the smallest TBS, and releases the buffer space in step 1553. Afterwards, the UE goes back to step 1511 and repeats the checking process again to find buffer space for the new TB. If the answer is yes, then in step 1561, the UE finds an existing HARQ process in $CC_j$ that 1) has allocated buffer space larger than $A/(x_j*N)$, 2) has the smallest TBS, and 3) has the smallest number of received RVs for the corresponding TB. This process is denoted as HARQ_TBR. In step 1562, the UE releases part of the HARQ_TBR space exceeding $A/(x_j*N)$. The release prioritizes the part with higher index of the circular buffer bits. Afterwards, the UE goes back to step 1511 and repeats the checking process again to find buffer space for the new TB. Under such common buffer pooling with fixed resolution allocation, each HARQ soft buffer for all active CCs is allocated from a common buffer pool according to available buffer space to improve HARQ memory space management.

Figure 16:
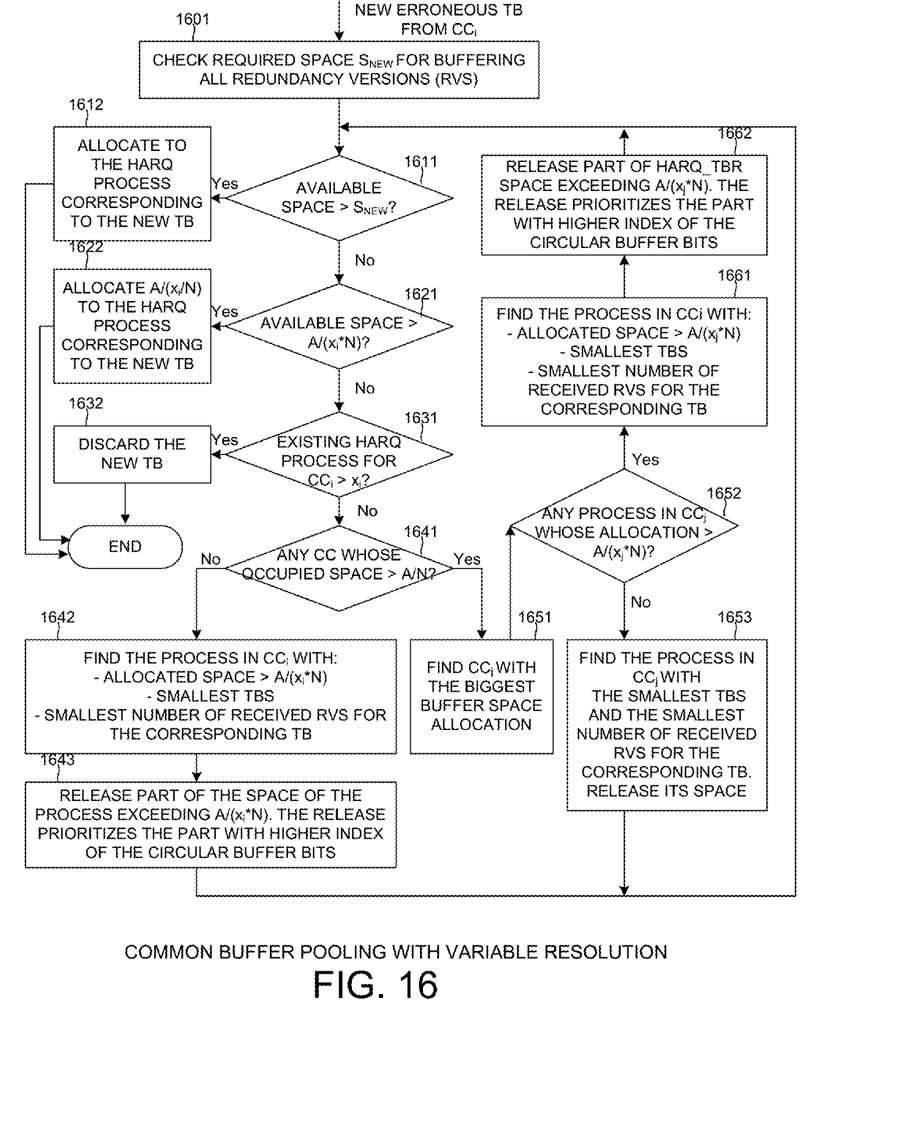
FIG. 16 illustrates a fifth embodiment of common buffer pooling with variable resolution.

FIG. 16 illustrates a fifth embodiment of common buffer pooling with variable resolution. For common buffer pooling with variable resolution, the total HARQ memory pool is shared among all activated CCs, and each HARQ soft buffer is allocated according to the size of corresponding erroneous TB. In step 1601, the UE receives a new erroneous TB from $CC_i$, and checks required space $S_{NEW}$ for buffering all redundancy versions (RVs) of the new TB. In step 1611, UE determines whether the available HARQ buffer space is larger or equal to $S_{NEW}$. If the answer is yes, then the UE allocates $S_{NEW}$ to the HARQ process corresponding to the new TB (step 1612). If the answer is no, then in step 1621, the UE determines whether the available HARQ buffer space is larger or equal to the minimum required buffer size $A/(x_i*N)$. If the answer is yes, then the UE allocates $A/(x_i*N)$ to the HARQ process corresponding to the new TB (step 1622). If the answer is no, then in step 1631, the UE determines whether the existing number of HARQ processes is larger or equal to $x_i$. If the answer is yes, then the UE discards the new TB in step 1632 because the UE has already fulfill the required number of HARQ processes for $CC_i$. If the answer is no, then in step 1641, the UE determines whether there is any CC whose occupied space is larger than A/N. If the answer is no, then in step 1642, the UE finds an existing HARQ process in $CC_i$ that 1) has allocated buffer space larger than $A/(x_i*N)$, 2) has the smallest TBS, and 3) has the smallest number of received RVs for the corresponding TB. In step 1643, the UE releases part of the buffer space that exceeds $A/(x_i*N)$. The release is prioritized to the circular buffer bits with higher index. Afterwards, the UE goes back to step 1611 and repeats the checking process again to find buffer space for the new TB.

If the answer to step 1641 is yes, then the UE finds $CC_j$ with the biggest buffer space allocation in step 1651. In step 1652, the UE checks whether there is any HARQ process in $CC_j$ whose buffer allocation is larger than $A(x_j*N)$. If the answer is no, then the UE finds the HARQ process in $CC_j$ with the smallest number of received RVs for the corresponding TB and has the smallest TBS, and releases the buffer space in step 1653. Afterwards, the UE goes back to step 1611 and repeats the checking process again to find buffer space for the new TB. If the answer is yes, then in step 1661, the UE finds an existing HARQ process in $CC_j$ that 1) has allocated buffer space larger than $A/(x_j*N)$, 2) has the smallest TBS, and 3) has the smallest number of received RVs for the corresponding TB. This process is denoted as HARQ_TBR. In step 1662, the UE releases part of the HARQ_TBR space exceeding $A/(x_j*N)$. The release prioritizes the part with higher index of the circular buffer bits. Afterwards, the UE goes back to step 1611 and repeats the checking process again to find buffer space for the new TB. Under such common buffer pooling variable resolution allocation, each HARQ soft buffer for all active CCs is allocated from a common buffer pool according to the size of a corresponding erroneous TB to optimize HARQ memory space management.

Figure 17:
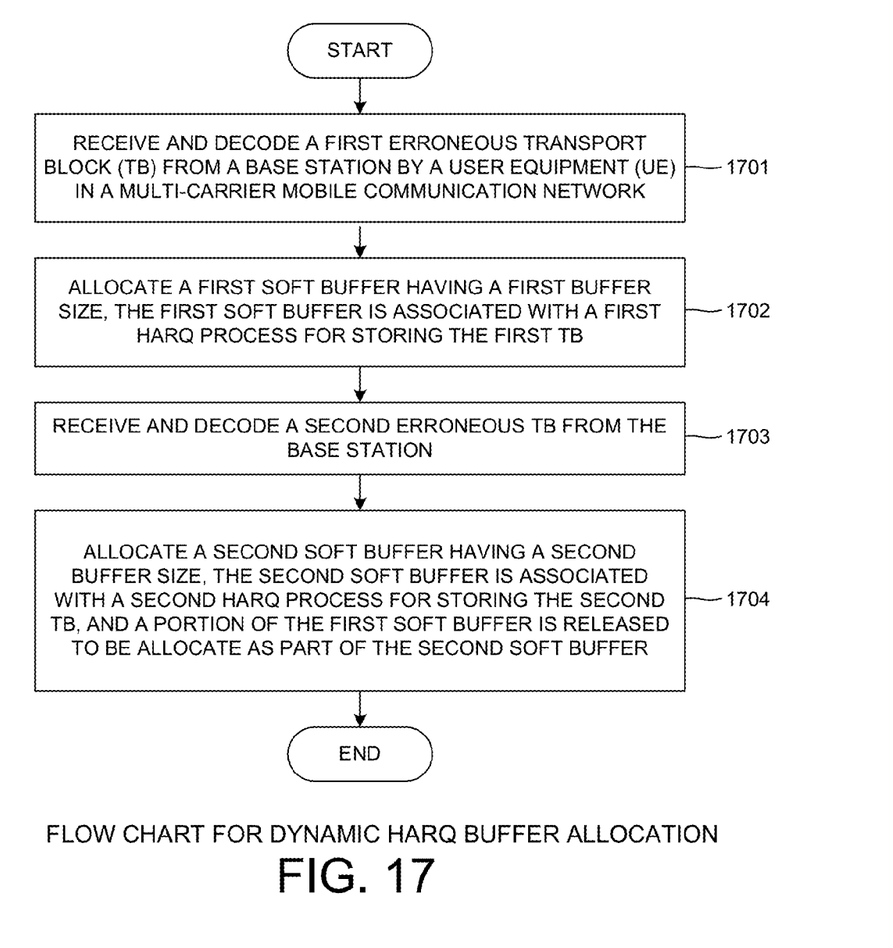
FIG. 17 is a flow chart of a method of dynamic buffer allocation for HARQ processes in accordance with one novel aspect.

FIG. 17 is a flow chart of a method of dynamic buffer allocation for HARQ processes in accordance with one novel aspect. In step 1701, a user equipment (UE) receives and decodes a first erroneous transport block (TB) from a base station in a mobile communication network. In step 1702, the UE allocates a first soft buffer having a first buffer size. The first soft buffer is associated with a first HARQ process for storing the first TB. In step 1703, the UE receives and decodes a second erroneous TB from the base station. In step 1704, the UE allocates a second soft buffer having a second buffer size. The second soft buffer is associated with a second HARQ process for storing the second TB. The UE releases a portion of the first soft buffer to be allocated as part of the second soft buffer. In one embodiment, a remaining buffer space of the first soft buffer meets a minimum system requirement based on a total number of required HARQ processes of a corresponding component carrier (CC) and a number of aggregated CCs. In addition, the second buffer size is also determined to meet a minimum system requirement based on the total number of required HARQ processes of a corresponding CC and the number of aggregated CCs.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    configuring one or more common buffer pools for a number of Hybrid Automatic Repeat Request (HARQ) processes, wherein the number of HARQ processes is greater than one and is predefined;
    receiving and decoding a first erroneous transport block (TB) from a base station by a user equipment (UE) in a multi-carrier mobile communication network;
    allocating a first soft buffer having a first buffer size from a first common buffer pool, wherein the first soft buffer is associated with a first HARQ process for storing the first TB and wherein the first soft buffer is a circular buffer, and wherein the UE first releases received bits of the first TB with a highest buffer index;
    receiving and decoding a second erroneous TB from the base station; and
    allocating a second soft buffer having a second buffer size, wherein the second soft buffer is associated with a second HARQ process for storing the second TB, and wherein a portion of the second soft buffer is allocated from the first common buffer pool and at least a portion of the first soft buffer is released to be allocated as part of the second soft buffer.

2. The method of claim 1, wherein a remaining buffer space of the first soft buffer meets a minimum system requirement based on a total number of required HARQ processes of a corresponding component carrier (CC) and a number of aggregated CCs.

3. The method of claim 1, wherein the UE operates under carrier aggregation with multiple component carriers (CCs), and wherein each CC has a dedicated buffer pool for HARQ process of each corresponding CC.

4. The method of claim 1, wherein the UE operates under carrier aggregation with multiple component carriers (CCs), and wherein all CCs share a common buffer pool for all HARQ processes of all CCs.

5. The method of claim 1, wherein the first buffer size equals to a fixed rate matching size used by the base station.

6. The method of claim 1, wherein the first buffer size is allocated when a number of erroneous TBs requiring HARQ is less than a predefined number.

7. The method of claim 1, wherein the second buffer size is allocated when a number of erroneous TBs requiring HARQ is larger than a predefined number.

8. The method of claim 7, wherein the second buffer size is smaller than the first buffer size, and wherein the predefined number is based on a required number of HARQ processes and a number of aggregated component carriers (CCs).

9. The method of claim 1, wherein the first buffer size is dynamically determined based on the first TB size (TBS).

10. The method of claim 1, wherein the second buffer size is determined to meet a minimum system requirement based on a total number of required HARQ processes of a corresponding component carrier (CC) and a number of aggregated CCs.

11. The method of claim 1, wherein the first HARQ process is selected for releasing the portion of the first soft buffer when the first TB has a smaller TB size (TBS) as compared to TBS of other HARQ processes.

12. The method of claim 1, wherein a third soft buffer associated with a third HARQ process is further selected, wherein part of the third soft buffer is released to be allocated as part of the second buffer, and wherein a remaining buffer space for the third soft buffer fulfills a minimum system requirement based on a total number of required HARQ process of a corresponding CC and a number of aggregated CCs.

13. A user equipment (UE) comprising:
    a receiver that receives a first transport block (TB) and a second TB from a base station by a user equipment (UE) in a multi-carrier mobile communication network;
    a decoder that decodes the first TB and the second TB to be erroneous TBs; and
    a Hybrid Automatic Repeat Request (HARQ) controller that configures one or more common buffer pools for a number of HARQ processes, wherein the number of HARQ processes is greater than one and is predefined, allocates a first soft buffer from a first common buffer pool having a first buffer size, wherein the first soft buffer is associated with a first HARQ process for storing the first TB, and wherein the first soft buffer is a circular buffer, and wherein the UE first releases received bits of the first TB with a highest buffer index, wherein the HARQ controller allocates a second soft buffer having a second buffer size, wherein the second soft buffer is associated with a second HARQ process for storing the second TB, and wherein at least a portion of the second soft buffer is allocated from the first common buffer pool and a portion of the first soft buffer is released to be allocated as part of the second soft buffer.

14. The UE of claim 13, wherein a remaining buffer space of the first soft buffer meets a minimum system requirement based on a total number of required HARQ processes of a corresponding component carrier (CC) and a number of aggregated CCs.

15. The UE of claim 13, wherein the UE operates under carrier aggregation with multiple component carriers (CCs), and wherein each CC has a dedicated buffer pool for HARQ process of each corresponding CC.

16. The UE of claim 13, wherein the UE operates under carrier aggregation with multiple component carriers (CCs), and wherein all CCs share a common buffer pool for all HARQ processes of all CCs.

17. The UE of claim 13, wherein the first buffer size equals to a fixed rate matching size used by the base station.

18. The UE of claim 13, wherein the first buffer size is allocated when a number of erroneous TBs requiring HARQ is less than a predefined number.

19. The UE of claim 13, wherein the second buffer size is allocated when a number of erroneous TBs requiring HARQ is larger than a predefined number.

20. The UE of claim 19, the second buffer size is smaller than the first buffer size, and wherein the predefined number is based on a required number of HARQ processes and a number of aggregated component carriers (CCs).

21. The UE of claim 13, wherein the first buffer size is dynamically determined based on the first TB size.

22. The UE of claim 13, wherein the second buffer size is determined to meet a minimum system requirement based on a total number of required HARQ processes of a corresponding component carrier (CC) and a number of aggregated CCs.

23. The UE of claim 13, wherein the first HARQ process is selected for releasing the portion of the first soft buffer when the first TB has a smaller TB size (TBS) as compared to TBS of other HARQ processes.

24. The UE of claim 13, wherein a third soft buffer associated with a third HARQ process is further selected, wherein part of the third soft buffer is released to be allocated as part of the second buffer, and wherein a remaining buffer space for the third soft buffer fulfills a minimum system requirement based on a total number of required HARQ process of a corresponding CC and a number of aggregated CCs.

* * * * *